United States Patent
Lee

(10) Patent No.: US 9,360,873 B2
(45) Date of Patent: Jun. 7, 2016

(54) THERMOSTAT THAT THE REACTIVITY THEREOF IS IMPROVED

(71) Applicants: Hyundai Motor Company, Seoul (KR); Kia Motors Corporation, Seoul (KR)

(72) Inventor: Philgi Lee, Suwon-si (KR)

(73) Assignees: Hyundai Motor Company, Seoul (KR); Kia Motors Company, Seoul (KR)

( * ) Notice: Subject to any disclaimer, the term of this patent is extended or adjusted under 35 U.S.C. 154(b) by 443 days.

(21) Appl. No.: 14/044,488

(22) Filed: Oct. 2, 2013

(65) Prior Publication Data

US 2014/0103126 A1    Apr. 17, 2014

(30) Foreign Application Priority Data

Oct. 16, 2012 (KR) .................... 10-2012-0114984

(51) Int. Cl.
*G05D 23/02* (2006.01)
*G05D 23/13* (2006.01)
*F01P 7/16* (2006.01)

(52) U.S. Cl.
CPC .......... *G05D 23/021* (2013.01); *G05D 23/1333* (2013.01); *F01P 7/16* (2013.01)

(58) Field of Classification Search
CPC ...... G05D 23/021; G05D 23/1333; F01P 7/16
USPC ................. 236/34, 34.5, 99 J, 99 K
See application file for complete search history.

(56) References Cited

U.S. PATENT DOCUMENTS

| | | | | |
|---|---|---|---|---|
| 4,674,679 A * | 6/1987 | Saur | ........ | F01P 7/167 236/34.5 |
| 5,494,005 A * | 2/1996 | Saur | ........ | F01P 7/167 123/41.1 |
| 5,979,778 A * | 11/1999 | Saur | ........ | F01P 7/16 236/34.5 |
| 6,457,652 B1 * | 10/2002 | Fukamachi | ...... | F01P 7/16 236/34.5 |
| 8,851,027 B2 * | 10/2014 | Lee | ........ | F01P 7/16 123/41.08 |
| 2014/0097258 A1 * | 4/2014 | Lee | .... | G05D 23/1333 236/101 C |
| 2014/0097259 A1 * | 4/2014 | Lee | .... | G05D 23/022 236/101 C |

FOREIGN PATENT DOCUMENTS

| | | |
|---|---|---|
| JP | 2004-263587 A | 9/2004 |
| KR | 10-0755264 B1 | 9/2007 |
| WO | WO 2009/104623 A1 | 8/2009 |

\* cited by examiner

*Primary Examiner* — Marc Norman
(74) *Attorney, Agent, or Firm* — Morgan, Lewis & Bockius LLP

(57) ABSTRACT

A thermostat having improved reactivity may include a thermostat case having side connected to first and second passages, and a third passage formed between the first and second passages in a side direction, a valve body where first and second valves are formed to open/close the first and second passages, and a mounting space is formed in the valve body, an elastic member elastically pushing the valve body in a direction of the first valve such that the first valve closes the first passage, and a drive portion moving the valve body in response to contraction or expansion of a wax disposed in the mounting space. A flowing turn wall may be formed to correspond to the third passage such that a liquid flowing in through the second passage moves in a direction opposite to the third passage.

7 Claims, 3 Drawing Sheets

THERMOSTAT THAT THE REACTIVITY THEREOF IS IMPROVED

CROSS-REFERENCE TO RELATED APPLICATION

The present application claims priority of Korean Patent Application Number 10-2012-0114984 filed Oct. 16, 2012, the entire contents of which application are incorporated herein for all purposes by this reference.

BACKGROUND OF INVENTION

1. Field of Invention

The present invention relates to a thermostat that the reactivity thereof is improved and changes a passage of a coolant depending on the temperature of the coolant and actively controls the coolant temperature to prevent the overheating thereof.

2. Description of Related Art

A thermostat for a vehicle is disposed between an engine and a radiator and is opened/closed in response to the temperature variation of coolant to adjust the flow rate of the coolant, and therefore the temperature of the coolant is controlled in a predetermined range.

A mechanical thermostat expands wax depending on the temperature of the coolant, and the expanding force of the wax makes a piston move the valve of the thermostat.

The mechanical thermostat is operated in response to a predetermined opening/closing temperature of the coolant to open/close the valve only in a predetermined temperature condition, and therefore the mechanical thermostat does not actively move against changes of the driving circumstances of the vehicle.

Accordingly, an electrical thermostat has been introduced to complements the drawback of the mechanical thermostat, and the electrical thermostat is operated to sustain the coolant temperature in an optimized range.

The electrical thermostat actively controls the coolant temperature of the engine according to the driving circumstances such as the load level of the vehicle to sustain the optimized coolant temperature, and the electrical thermostat can improve fuel consumption efficiency and reduce exhaust gas.

Meanwhile, when a first valve is closed in a thermostat, the coolant that is supplied through a second passage flows around a wax case that is disposed in a valve guide and wax that is charged in the wax case is contracted or expanded.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a thermostat that the reactivity thereof is improved having advantages of improving the reactivity of the wax in response to the coolant temperature and improving the efficiency of an engine. Further, the present invention provides a thermostat having advantages of preventing the relative rotation of the drive portion for operating a piston and a valve body.

A thermostat having improved reactivity according to various aspects of the present invention may include a thermostat case that one side thereof is connected to a first passage, the other side thereof is connected to a second passage, and a third passage is formed between the first and second passages in a side direction, a valve body where a first valve is formed at one side thereof to open/close the first passage, a second valve is formed at the other side thereof to open/close the second passage, and a mounting space is formed therein, an elastic member that elastically pushes the valve body in a direction of the first valve such that the first valve closes the first passage, and a drive portion that moves the valve body in response to contraction or expansion of a wax that is disposed in the mounting space of the valve body, wherein a flowing turn wall is formed to correspond to the third passage such that a liquid that flows in through the second passage moves in a direction opposite to the third passage.

The valve body may include a length-direction element that is extended in a length direction and is arranged along a circumference of the drive portion at a first predetermined distance, and a circumference-direction element that is extended along the circumference of the drive portion and is arranged in a length direction at a second predetermined distance, wherein the flowing turn wall is formed in a section formed by the circumference-direction element and the length-direction element.

The flowing turn wall may be formed at an end portion of the valve body. The flowing turn wall may be integrally formed with the circumference-direction element or the length-direction element or with both the circumference-direction element and the length-direction element.

The circumference-direction element may include a first ring member that is formed at a central portion of the valve body, and a second ring member that is formed at one end portion of the valve body, wherein the flowing turn wall is formed between the first and second ring members.

The drive portion may include the drive portion includes a main piston that is movable in response to the contraction or expansion of the wax, a piston support portion supporting one end portion of the piston is formed in the mounting space of the valve body, and the second valve is integrally formed along a circumference of the piston support portion.

A mounting hole that is connected to the mounting space may be formed at a central portion of the first valve, a groove may be formed on the interior circumference of the mounting hole in the length direction, and a protrusion may be formed on the exterior circumference of the drive portion that is inserted into the mounting hole to correspond to the groove.

In a thermostat that the reactivity thereof is improved according to various aspects of the present invention, the flowing turn wall that is formed on the valve body helps the coolant to pass the wax case such that the reactivity for the coolant temperature is improved.

Further, the valve body is formed to be integrally with the first valve, a groove is formed on the interior circumference of a mounting hole of a first valve, a protrusion is formed on the exterior circumference of the drive portion that is inserted into a mounting space of the valve body through a mounting hole such that the movement of the valve body is guided in a length direction and the relative rotation of the valve guide and the first valve is prevented.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
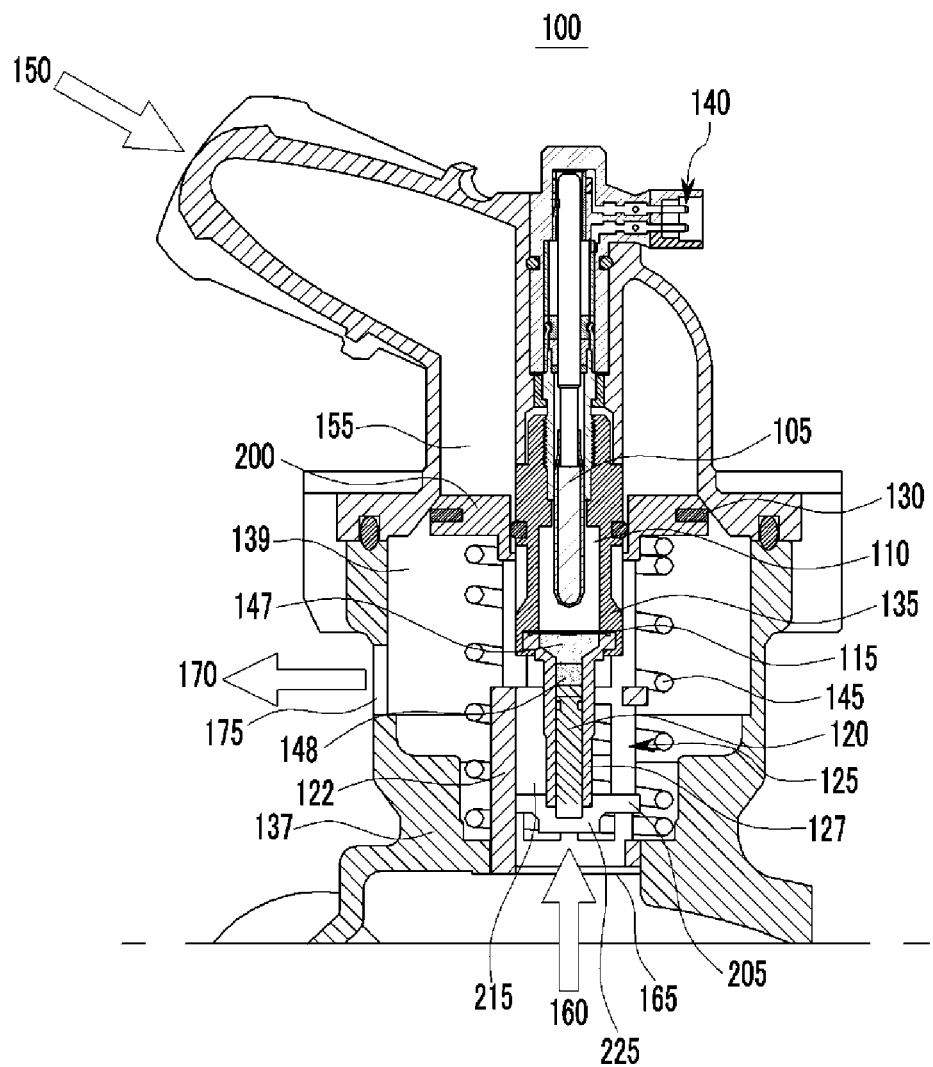
FIG. 1 is a partial cross sectional view of an exemplary thermostat that is disposed on an engine according to the present invention.

FIG. 1 is a partial cross sectional view of a thermostat that is disposed on an engine according to various embodiments of the present invention. Referring to FIG. 1, an engine having a thermostat includes a radiator 150, a coolant outlet 160 of an engine, a coolant inlet 170 of an engine, and a thermostat 100.

The thermostat 100 includes a thermostat case 137, and a first passage 155 is formed to be connected to the radiator 150, a second passage 165 is formed to be connected to the coolant outlet 160, and a third passage 175 is connected to the coolant inlet 170 in the thermostat case 137.

A coolant pump in various embodiments of the present invention is disposed between the third passage 175 and the coolant inlet 170 to circulate coolant from the thermostat 100 to the engine.

As shown in drawings, the first passage 155 is formed at an upper side in an upward direction, the second passage 165 is formed at a lower side in a downward direction, and the third passage 175 is formed between the first and second passage 155 and 165 at a side (e.g., left side) in a lateral direction.

A joining space 139 is formed in the thermostat case 137 to be connected to the first passage 155, the second passage 165, and the third passage 175, and the valve body 125 is disposed in the joining space 139.

A first valve 200 is integrally formed at an upper end portion of the valve body 125 to selectively close the first passage 155, and a second valve 205 is integrally formed at a lower end portion of the valve body 125 to selectively close the second passage 165. One will appreciate that these integral components may be monolithically formed.

Further, a valve O-ring 130 is mounted along an exterior circumference of the first valve 200 to contact the interior circumference of the first passage 155.

A main spring 145 is disposed inside the thermostat case 137, and an upper end portion of the main spring 145 elastically supports the lower end portion of the first valve 200 in an upward direction and a lower end portion of the main spring 145 is supported by an inner side of the thermostat case 137. The mainspring 145 has a coil spring structure and the valve body 125 is inserted into the main spring 145.

Further, a mounting space is formed along a central portion of the valve body 125 from an upper end side to a lower end side, and a drive portion that moves the valve body 125 is inserted into the mounting space 215.

The drive portion includes a main piston 120, a rubber piston 148, a piston guide 127, a semi fluid 147, a diaphragm 115, a wax 110, a wax case 135, and a glow plug 105, wherein the glow plug 105 is electrically connected to a connector 140.

And, a piston support portion 225 is formed at a central portion of the second valve 205 that is formed at a lower side of the valve body 125. Further, the second valve 205 is integrally formed with the piston support portion 225. One will appreciate that these integral components may be monolithically formed.

A flowing turn wall 122 is formed on the valve body 125 in various embodiments of the present invention. The flowing turn wall 122 is formed at the same side where the third passage 175 is disposed and at a lower end portion of the valve body 125.

Here, if the second valve 205 opens the second passage 165, the coolant flows upward through the second passage 165, wherein the coolant flows to the right side by the flowing turn wall 122 that is formed at a left side.

More particularly, the coolant flows in a right side of the valve body 125 through the second passage 165, and then the coolant of the right side penetrates the valve body 125 is supplied to the third passage 175 of the left side. While the coolant penetrates the valve body 125, the coolant flows around the wax case 135, and the wax 110 that is charged in the wax case 135 is contracted or expanded by the temperature of the coolant in various embodiments of the present invention.

If there were no flowing turn wall 122, almost all the coolant would not pass the wax case 135, instead it would pass the third passage 175, and therefore the temperature reactivity of the wax 110 would be deteriorated.

Figure 2:
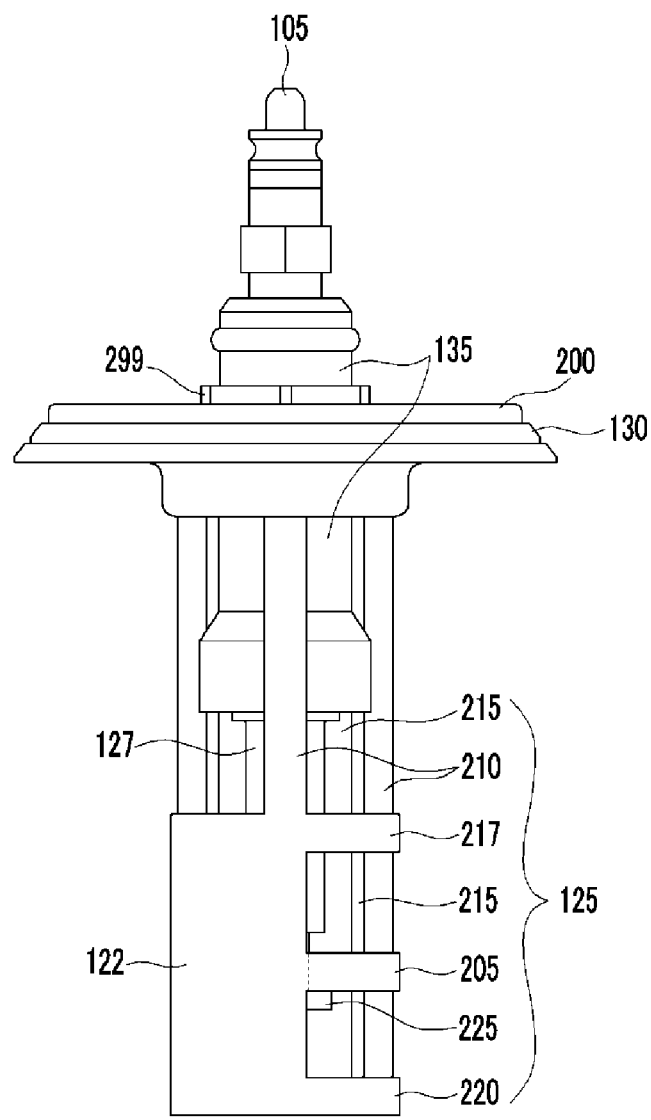
FIG. 2 is a side view showing a case that a drive portion is inserted into a valve body in an exemplary thermostat according to the present invention.
Figure 3:
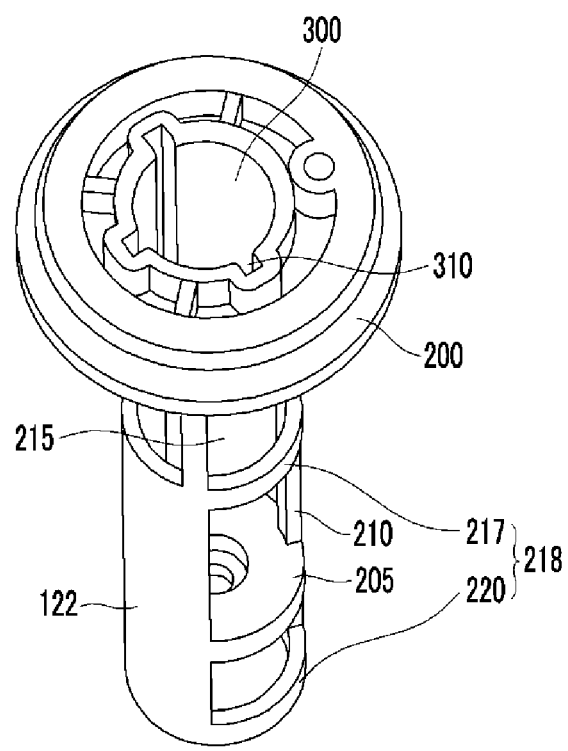
FIG. 3 is a perspective view of a valve body that a first valve and a second valve are integrally formed in an exemplary thermostat according to the present invention.

FIG. 2 is a side view showing a case that a drive portion is inserted into a valve body in a thermostat according to various embodiments of the present invention, and FIG. 3 is a perspective view of a valve body that a first valve and a second valve are integrally formed in a thermostat according to various embodiments of the present invention. One will appreciate that these integral components may be monolithically formed.

Referring to FIG. 2 and FIG. 3, the first valve 200 is formed at an upper end portion of the valve body 125, a valve O-ring 130 is disposed along a groove that is formed along the circumference direction of the first valve 200.

A mounting space 215 is formed at a central portion of the valve body 125 along the length direction of the valve body 125, and one end part of the drive portion is inserted into the mounting space 215. As shown in the drawings, the drive portion includes the wax case 135, a piston guide 127, and a main piston 120.

The valve body 125 includes a length-direction element 210 and a circumference-direction element 218. The length-direction element 210 is extended in a length direction of the valve body 125 and is arranged along the circumference direction of the mounting space 215 at a predetermined gap. And, the circumference-direction element 218 is extended along the circumference of the mounting space 215 and is arranged along the length direction of the valve body 125 at a predetermined distance.

The circumference-direction element 218 includes a first ring member 217 and a second ring member 220. The first ring member 217 is formed at a central portion of the length direction of the valve body 125 and the second ring member 220 is formed at a lower end portion of the valve body 125.

The second valve 205 is disposed between the first and second ring member 217 and 220, and the piston support portion 225 corresponding to the second valve 205 is formed in the mounting space 215.

The flowing turn wall 122 is formed to correspond to the third passage 175 between the first ring member 217 and the second ring member 220. The flowing turn wall 122 is only formed in a predetermined range along the circumference of the valve body 125.

Three length-direction elements 210 can be formed with approximately 120 degrees in a circumferential direction of the valve body, and the flowing turn wall 122 can be formed in approximately 120 degrees range in a circumference direction of the valve body 125 in various embodiments of the present invention.

Referring to FIG. 3, a mounting hole 300 is formed at a central portion of an upper end surface of the first valve 200 and the valve body 125 corresponding to the mounting hole 300 is integrally formed with the first valve 200 in a lower direction. One will appreciate that these integral components may be monolithically formed.

The mounting space 215 is formed at a central portion of the valve body 125 in a length direction thereof, and the drive portion is inserted into the mounting space 215 through the mounting hole 300.

A groove 310 is formed on the interior circumference of the mounting hole 300 to guide the movement of the drive portion and the first valve 200 and to prevent the relative rotation thereof.

Referring to FIG. 2 and FIG. 3, a protrusion corresponding to the groove 310 is formed on the exterior circumference of the wax case 135 of the drive portion in the length direction. Accordingly, when the drive portion pushes the first valve 200 and the valve body 125, the drive portion guides the movement of the first valve 200 and the valve body 125 along the groove and the protrusion.

And, the engagement structure of the protrusion and the groove 310 that is formed on the interior circumference of the mounting hole 300 can prevent the relative rotation between the wax case 135 and the first valve 200 (and 125).

The length (or height) of the flowing turn wall 122 can be readily varied according to the position of the third passage and the design specification in various embodiments of the present invention.

For convenience in explanation and accurate definition in the appended claims, the terms "upper" or "lower", "left" or "right", "upward" or "downward", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A thermostat having improved reactivity, comprising:
    a thermostat case that one side thereof is connected to a first passage, the other side thereof is connected to a second passage, and a third passage is formed between the first and second passages in a side direction;
    a valve body where a first valve is formed at one side thereof to open/close the first passage, a second valve is formed at the other side thereof to open/close the second passage, and a mounting space is formed therein;
    an elastic member that elastically pushes the valve body in a direction of the first valve such that the first valve closes the first passage; and
    a drive portion that moves the valve body in response to contraction or expansion of a wax that is disposed in the mounting space of the valve body, wherein a flowing turn wall is formed to correspond to the third passage such that a liquid that flows in through the second passage moves in a direction opposite to the third passage.

2. The thermostat of claim 1, wherein the valve body includes a length-direction element that is extended in a length direction and is arranged along a circumference of the drive portion at a first predetermined distance; and
    a circumference-direction element that is extended along the circumference of the drive portion and is arranged in a length direction at a second predetermined distance, wherein the flowing turn wall is formed in a section formed by the circumference-direction element and the length-direction element.

3. The thermostat of claim 2, wherein the flowing turn wall is formed at an end portion of the valve body.

4. The thermostat of claim 2, wherein the flowing turn wall is integrally formed with the circumference-direction element or the length-direction element or with both the circumference-direction element and the length-direction element.

5. The thermostat of claim 2, wherein the circumference-direction element includes:
    a first ring member that is formed at a central portion of the valve body; and
    a second ring member that is formed at one end portion of the valve body, wherein the flowing turn wall is formed between the first and second ring members.

6. The thermostat of claim 2, wherein
    a mounting hole connected to the mounting space is formed at a central portion of the first valve;
    a groove is formed on an interior circumference of the mounting hole in a length direction; and
    a protrusion is formed on an exterior circumference of the drive portion that is inserted into the mounting hole to correspond to the groove.

7. The thermostat of claim 1, wherein
    the drive portion includes a main piston that is movable in response to the contraction or expansion of the wax;
    a piston support portion supporting one end portion of the piston is formed in the mounting space of the valve body; and
    the second valve is integrally formed along a circumference of the piston support portion.

* * * * *